UNITED STATES PATENT OFFICE.

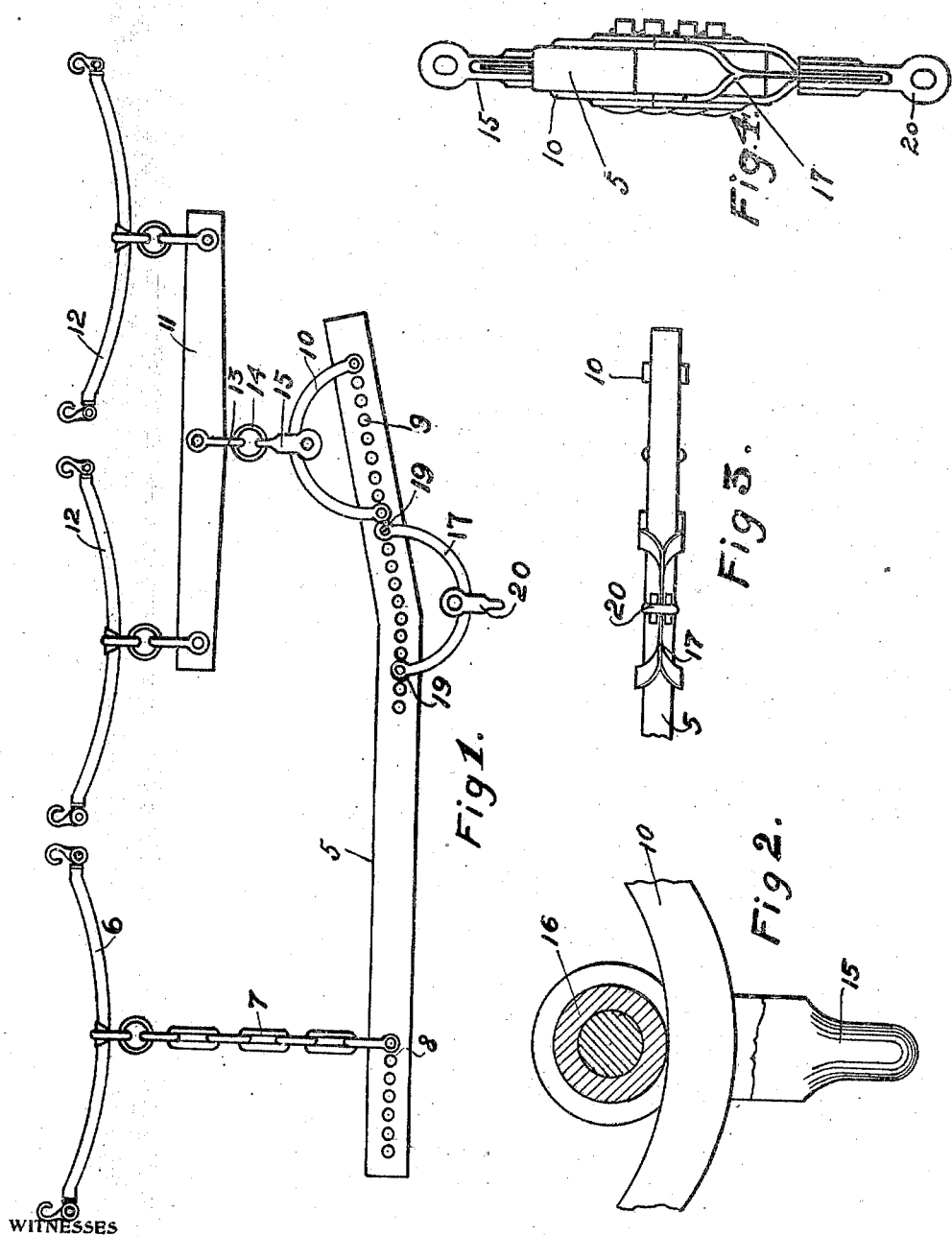

THOMAS S. MOFFETT, OF SPOKANE, WASHINGTON.

THREE-HORSE EVENER.

950,943. Specification of Letters Patent. Patented Mar. 1, 1910.

Application filed September 21, 1909. Serial No. 518,801.

*To all whom it may concern:*

Be it known that I, THOMAS S. MOFFETT, a citizen of the United States, residing at Spokane, in the county of Spokane and State of Washington, have invented certain new and useful Improvements in Three-Horse Eveners, of which the following is a specification.

This invention has for its object to provide a three-horse evener embodying certain novel structural details to be hereinafter described and claimed, the parts being arranged to permit the horses to pull abreast.

The invention also has for its object to provide an improved connection between the evener bar and the doubletree, by means of which adjustment may be readily made to properly equalize the draft.

In the accompanying drawing forming a part of this specification, Figure 1 is a plan view of the invention. Fig. 2 is a sectional detail of the sliding connection between the evener bar and the doubletree. Fig. 3 is a rear edge view of one end of the evener bar. Fig. 4 is an end view.

Referring more particularly to the drawing, 5 denotes an evener bar, to one end of which a swingletree 6 is connected by a chain 7, which is adjustably held by a pin passed through one of a series of holes 8 in said end of the bar. The other end of the bar is bent slightly forwardly to bring the horse abreast, and in said end is a series of holes 9. This end of the bar carries an arcuate bracket 10 extending forwardly therefrom. The bracket is adjustably connected to the bar by pins passing through holes in the ends of the bracket, and through two of the holes 9. A doubletree 11, carrying at its ends swingletrees 12, is connected to the bracket 10. On the doubletree is a rearwardly presented hook 13, to which is connected a ring 14, carried by a hook 15. The last-mentioned hook has its shank forked to straddle the bracket 10, and between the branches of the fork is journaled a roller 16 which engages the inner edge of the bracket 10. The bracket is substantially semi-circular in shape, and the roller runs freely on its inner edge, by reason of which the doubletree is at all times held in proper position.

To the end of the bar 5 which carries the doubletree 11, is also connected a rearwardly extending arcuate bracket 17 for attachment of the bar to the draw bar (not shown). This bracket is also adjustably mounted on the evener bar by pins 19 passing through holes in the ends of the bracket, and through two of the holes 9, and on said bracket is mounted a roller carried by a hook 20 connected to the draw bar. The roller engages the inner edge of the bracket 17 in the same manner as the roller 16.

By providing the herein described connection between the evener bar and the draw bar, the former can readily swing when a turn is made, and after the turn is completed, the parts automatically swing back to their proper position, the same being true with respect to the doubletree 11, by reason of the connection between the same and the evener bar. All the parts are readily adjustable to properly distribute the draft.

I claim:

1. The combination with an evener bar, of a swingletree connected to one end thereof, an arcuate bracket carried by the other end of the bar, a hook, a roller carried by the hook, and engageable with the inner edge of the bracket, and a doubletree connected to the hook.

2. The combination with an evener bar, of a swingletree connected to one end thereof, an arcuate bracket carried by the other end of the bar, a hook, a roller carried by the hook, said hook having a forked shank to straddle the bracket, and between the branches of which fork the roller is journaled, and a doubletree connected to the hook.

3. The combination with an evener bar, of a swingletree connected to one end thereof, an arcuate bracket carried by the other end of the bar, and projecting forwardly therefrom, a hook, a roller carried by the hook, and engageable with the inner edge of the bracket, a doubletree connected to the hook, an arcuate bracket carried by the bar adjacent to the first-mentioned bracket, and projecting rearwardly from the bar, a hook, and a roller carried by the hook, and engageable with the inner edge of the rearwardly projecting bracket.

In testimony whereof I affix my signature in presence of two witnesses.

THOMAS S. MOFFETT.

Witnesses:
H. E. SMITH,
NETTIE KING.